June 23, 1953 M. D'HEILLY 2,642,876

CARD FILE BOX

Filed April 11, 1950 2 Sheets-Sheet 1

INVENTOR
MARCELLE D'HEILLY
By: Haseltine, Lake & Co.
AGENTS

INVENTOR
MARCELLE D'HEILLY
By:
Haseltine, Lake & Co.
AGENTS

Patented June 23, 1953 2,642,876

UNITED STATES PATENT OFFICE 2,642,876

CARD FILE BOX

Marcelle D'Heilly, Paris, France, assignor to Societe Anonyme de l'Ecluse, Tangiers, North West Africa, a joint-stock company of Tangiers, North West Africa Application April 11, 1950, Serial No. 155,292
In France April 13, 1949

5 Claims. (Cl. 129—43)

My invention relates to a card file box which is characterised in that the space available in the box is completely filled by the cards and that the card wrapper also provides a means, with the aid of which the card file can be consulted without any particular member being necessary, to keep the cards erect for consultation.

My invention makes it possible, at equal number of cards, to obtain a card file box of minimum size and weight, which consequently makes it more easily transportable.

One is aware that in conventional card file boxes the space available is not wholly occupied by the cards and that in addition, in order that the card file may be consulted easily, means have to be provided to keep the cards substantially erect.

The aforementioned inconveniences are avoided in the card file box that provides the subject-matter of my invention.

My card file box comprises a movable front end portion an extension of which constitutes a part of its cover. Slidably received in the said box is a card wrapper comprising a pair of cheeks connected with each other by a back which is guided as the card wrapper is shifted either to its opening or to its closing position by faces provided on the sides and the bottom of the box respectively. Once the wrapper has been rocked erect the two cheeks of the same find a rest on the edges of an aperture provided in the cover of the box, whereby the file can be consulted easily without any special means being required for that purpose.

A particular embodiment of my invention is illustrated for the purpose of exemplification and by no means of limitation in the appended drawing in which.

My card file box comprises a bottom 1, a pair of side walls, 2, 2, a rear end wall 3 and a front end wall 4. The latter is hinged on the one hand at $4^a$ to the bottom 1 and at $4^b$ to a flap $5^a$ which provides a movable section of the cover the other section $5^b$ of which is unmovable.

Figure 1:
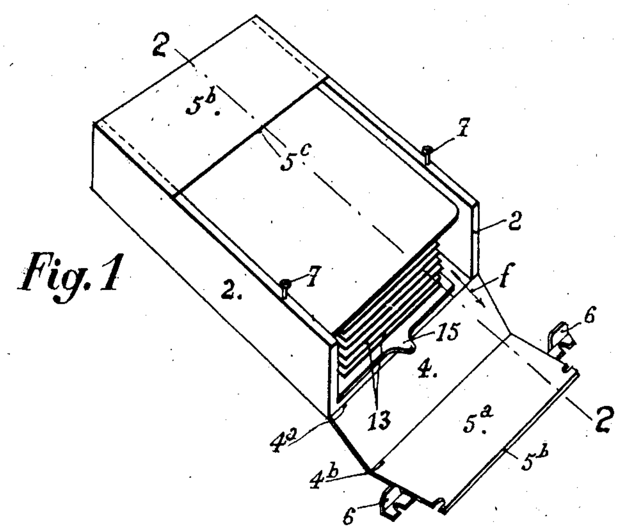
Figure 1 is a perspective view of the card file box with its front end wall dropped.
Figures 2, 3, 4:
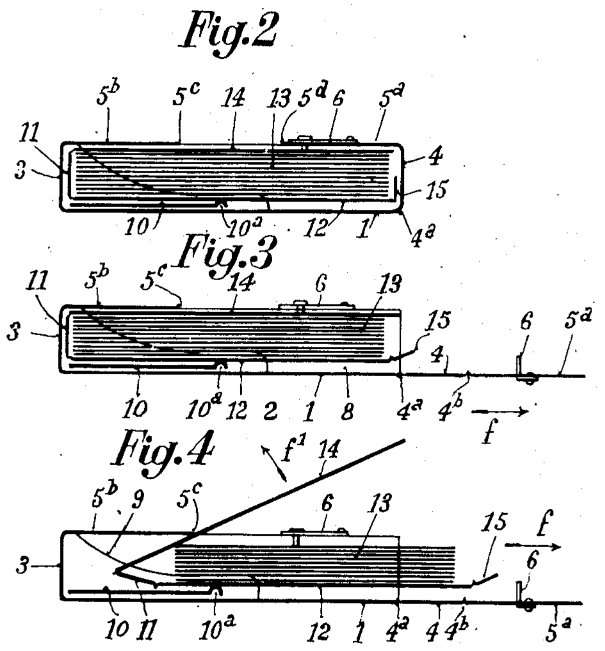
Figure 2 is a diagrammatic vertical cross-section of the box in its closed position, taken on line 2—2 in Fig. 1.
Figure 3 is a similar vertical cross-section of the box with its front end wall dropped.
Figure 4 is a similar vertical cross-section of the box with the card wrapper partly pulled out of the same.

Said cover section $5^a$ is provided with retaining lugs 6, 6 which in the closing position of said section as shown in Fig. 2 are clamped below the heads of pegs 7, 7 driven in the edges of the sides of the box. The distance between the opposite edges $5^d$ and $5^c$ of sections $5^a$ and $5^b$ respectively in the closed position of the box is larger than the height of the box which is substantially equal to the thickness of the card pile as will be explained hereinafter.

Figure 7:
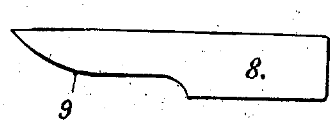
Figure 7 is a detail view showing a particular embodiment of a card wrapper guide.

Each side 2 of the box is provided with a curved camming face 9 the concavity of which is turned upwards and which for instance may be molded in the said side. As shown in the drawing the said camming faces are formed on cardboard or like plates 8 (see Fig. 7) glued or affixed in any other suitable manner to the inner faces of the sides 2, 2.

Secured to or cast with the bottom 1 of the box is a plate 10 provided with an end rib $10^a$ the purpose of which will be explained hereinafter.

Figure 8:
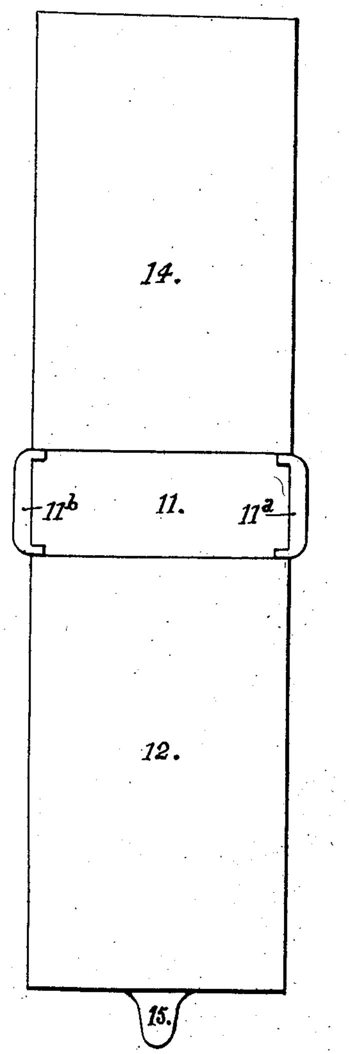
Figure 8 shows the card wrapper in its developed state.

The card wrapper can alternately be enclosed in the box or swung erect on the same ready for the consultation of the cards; its shape is somewhat similar to that of a book inasmuch as it comprises a back 11 and a pair of cheeks 12, 14 hinged to either side of said back; the cards 13 are loosely enclosed between said cheeks. The cheek 12 is formed with a lug 15 while the back 11 extends slightly beyond the cheeks 12, 14 at $11^a$, $11^b$ as shown in Fig. 8.

In the closing position of the wrapper (see Figs. 2 and 3) the back 11 engages the inside of the rear end wall 3 of the box while the cheeks 12 and 14 respectively lie adjacent to the bottom 1 of the box and to the sections $5^a$, $5^b$ providing the cover of the same (see Fig. 2).

With the card file box in the position just described the operation for a consultation of the file or a manipulation of the cards is as follows:

The hinged system 4, $5^a$ is disengaged from the retaining pegs 6, 6 and laid flat in one plane with the bottom 1 as shown in Fig. 3. The card wrapper with the cards contained therein are then pulled as a whole out of the box with the aid of a lug 15 or any equivalent member. The result is that the wrapper back 11 is moved away from its position in contact with the inside of the back wall 3 along the path imposed thereupon by the engagement of the projections 11$^a$, 11$^b$ of said back with the guides 9. The result is that said wrapper back is deviated progressively from its initial vertical position to more and more inclined positions as exemplified in Fig. 4 and finally to lie on a level with the bottom 1 and in front of the rib 10$^a$.

Figure 5:
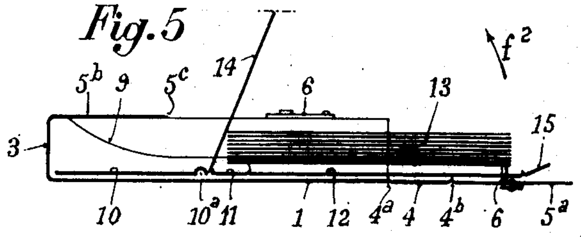
Figure 5 is a similar vertical cross-section of the box with the card wrapper completely pulled out of the same.

In the early stages of the movement the cheek 14 which is carried along by the back 11 is swung up in the direction shown by the arrow $f^1$ owing to its being stopped by the edge 5$^c$ of the cover (see Fig. 4). In the later stages of the movement the said cover comes to the position shown in Fig. 5, at a distance from said edge 5$^c$.

Figure 6:
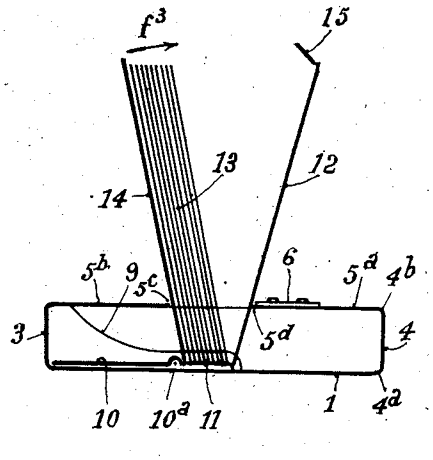
Figure 6 is a similar vertical cross-section of the box with the cards erected to consulting position.

Thereafter, by lifting the cheek 12 clear from the bottom 1 in the direction shown by the arrow $f^2$ and fixing the hinged wall system 4, 5$^a$ on the top of the box the card wrapper and the cards contained therein assume the position shown in Fig. 6 in which the said wrapper is erected with its back 11 resting on the box bottom and projects upwards through the gap provided between the edges 5$^c$ and 5$^d$ by which it is held in a stable position ready for an easy consultation or manipulation of the cards 13. More particularly, the cheek 14 on which the block of cards finds a rest is retained at its bottom by the rib 10$^a$.

In order to return the card wrapper to its position within the box following the consultation of the file or the manipulation of the cards the wall system 4, 5$^a$ is released and laid on a level with the bottom 1 of the box and the wrapper cheek 12 is pushed towards the back end wall of the box, whereby the cheek 14 is deflected downwards progressively in the direction shown by the arrow 5$^c$ owing to its encountering the edge 5$^c$, whereby the back 11 is caused to jump the rib 10$^a$ and by its cooperation with the guides 9 to be moved again into its former vertical position, i. e. parallel with the end wall 3 of the box; the card wrapper is thus completely enclosed again in its box, as a complement of which the hinged system 4, 5$^a$ is swung up again to its box-closing position.

What I claim is:

1. An index card file, wherein cards are stored with the least possible dead space and wherein the cards may be individually examined without removal from the box comprising, in combination: a card wrapper comprising a back and two cheeks hinged to the back, the cards being stacked between and substantially in register with the cheeks, whereby upon partial opening of the wrapper the cards may be supported on either cheek for examination, a box comprising a hollow shoe member comprising a bottom wall, two longitudinal side walls, a rear transverse end wall and a fixed partial cover portion joining the side and end walls, and a relatively movable closure member comprising a front transverse end wall hinged to the end of the bottom wall remote from the rear end wall and a movable partial cover portion hinged to the front end wall, the dimensions of the fixed and movable cover portions being such that the difference between the total length of the box and the sum of the lengths of the two cover portions exceeds the width of the wrapper, internal guide ramps on the side walls curving from an intermediate point thereof rearwardly and upwardly from the bottom wall to the fixed cover portion, and means extending from the back of the wrapper for cooperation with said ramps.

2. An index card file as in claim 1 wherein the lower cheek of the wrapper in the stacked position comprises a pull-tab extending therefrom.

3. An index card file as in claim 1 further comprising releasing locking means having complementary parts respectively on the side walls and on the movable cover portion.

4. An index card file as in claim 1 further comprising an internal transverse rib in the bottom wall the distance from which to the lower forward end of the ramps is at least equal to the width of the back of the wrapper.

5. An index card file as in claim 4 wherein the transverse rib and a line joining the lower forward ends of both ramps both fall between the projections onto the bottom wall of the adjacent edges of the two cover portions.

MARCELLE D'HEILLY.

References Cited in the file of this patent

UNITED STATES PATENTS

| Number | Name | Date |
|---|---|---|
| 116,506 | Smith | June 27, 1871 |
| 1,004,123 | Whitehead | Sept. 26, 1911 |
| 2,298,128 | Hurley | Oct. 6, 1942 |
| 2,304,758 | Botham | Dec. 8, 1942 |

FOREIGN PATENTS

| Number | Country | Date |
|---|---|---|
| 161,855 | Switzerland | 1933 |
| 195,082 | Switzerland | Mar. 16, 1938 |
| 206,449 | Switzerland | 1940 |
| 232,617 | Switzerland | 1944 |